(12) United States Patent
Leech

(10) Patent No.: US 11,561,550 B2
(45) Date of Patent: Jan. 24, 2023

(54) ROBOTIC CLEANER HAVING DISTANCE SENSORS FOR USE IN ESTIMATING A VELOCITY OF THE ROBOTIC CLEANER

(71) Applicant: SharkNinja Operating, LLC, Needham, MA (US)

(72) Inventor: Adam Leech, Newton, MA (US)

(73) Assignee: SharkNinja Operating LLC, Needham, MA (US)

( * ) Notice: Subject to any disclaimer, the term of this patent is extended or adjusted under 35 U.S.C. 154(b) by 248 days.

(21) Appl. No.: 16/722,822

(22) Filed: Dec. 20, 2019

(65) Prior Publication Data

US 2020/0201348 A1 Jun. 25, 2020

Related U.S. Application Data

(60) Provisional application No. 62/782,656, filed on Dec. 20, 2018.

(51) Int. Cl.
| | | |
|---|---|---|
| *G05D 1/02* | (2020.01) | |
| *B60W 60/00* | (2020.01) | |
| *A47L 11/40* | (2006.01) | |

(52) U.S. Cl.
CPC ........ *G05D 1/0238* (2013.01); *A47L 11/4061* (2013.01); *B60W 60/0011* (2020.02);
(Continued)

(58) Field of Classification Search
CPC .. G05D 1/0238; G05D 1/0217; G05D 1/0223; G05D 1/0272; G05D 2201/0215;
(Continued)

(56) References Cited

U.S. PATENT DOCUMENTS

| | | | |
|---|---|---|---|
| 6,226,830 B1 * | 5/2001 | Hendriks | .................. A47L 5/36 15/327.2 |
| 10,024,964 B2 | 7/2018 | Pierce et al. | |

(Continued)

FOREIGN PATENT DOCUMENTS

WO 2017157421 A1 9/2017

OTHER PUBLICATIONS

Between Definition & Meaning _ Dictionary.pdf (Between Definition & Meaning | Dictionary.com, May 19, 2022, https://www.dictionary.com/browse/between, pp. 1-2) (Year: 2022).*
(Continued)

*Primary Examiner* — Bao Long T Nguyen
(74) *Attorney, Agent, or Firm* — Grossman Tucker Perreault & Pfleger, PLLC

(57) ABSTRACT

A robotic cleaner may include a body, one or more driven wheels configured to urge the body across a surface to be cleaned, one or more distance sensors disposed at least partially within the body such that the one or more distance sensors face the surface to be cleaned and a processor. The one or more distance sensors may be configured to output a measure of a detection distance that extends in a direction of the surface to be cleaned. The processor may be configured to determine whether an abnormality has been detected based, at least in part, on the measure of the detection distance and may be configured to determine a first velocity estimate based, at least in part, on the detection of the abnormality.

13 Claims, 3 Drawing Sheets

(52) U.S. Cl.
CPC ......... *G05D 1/0217* (2013.01); *G05D 1/0223* (2013.01); *G05D 1/0272* (2013.01); *A47L 2201/04* (2013.01); *A47L 2201/06* (2013.01); *G05D 2201/0215* (2013.01)

(58) Field of Classification Search
CPC ......... G05D 2201/0203; A47L 11/4061; A47L 2201/04; A47L 2201/06; A47L 9/2852; A47L 9/2805; B60W 60/0011; G01P 3/38; G01S 17/48; G01S 17/58; G01S 17/89; G01S 17/06; G01S 1/70
See application file for complete search history.

(56) References Cited

U.S. PATENT DOCUMENTS

| | | | | |
|---|---|---|---|---|
| 2009/0190007 A1* | 7/2009 | Oggier | ............ | G06T 5/002 348/241 |
| 2014/0088761 A1* | 3/2014 | Shamlian | ............ | G05D 1/0227 700/253 |
| 2014/0129027 A1* | 5/2014 | Schnittman | .......... | G05D 1/0242 700/253 |
| 2019/0163200 A1* | 5/2019 | Kato | .................... | G05D 1/0223 |

OTHER PUBLICATIONS

Between definition—Google Search.pdf (between definition—Google Search.pdf, May 19, 2022, https://www.google.com/search?q=between+definition, p. 1) (Year: 2022).*

PCT Search Report and Written Opinion dated Feb. 27, 2020, received in PCT Application No. PCT/US19/67891, 12 Pgs.

Chinese Office Action with English translation dated Feb. 23, 2022, received in Chinese Patent Application No. 201980084383.6, 10 pages.

* cited by examiner

ROBOTIC CLEANER HAVING DISTANCE SENSORS FOR USE IN ESTIMATING A VELOCITY OF THE ROBOTIC CLEANER

CROSS-REFERENCE TO RELATED APPLICATIONS

The present application claims the benefit of U.S. Provisional Application Ser. No. 62/782,656 filed on Dec. 20, 2018, entitled Robotic Cleaner having Distance Sensors for use in Estimating a Velocity of the Robotic Cleaner, which is fully incorporated herein by reference.

TECHNICAL FIELD

The present disclosure is generally related to estimating velocity of autonomous devices and more specifically related to estimating a velocity of a robotic cleaner using one or more distance sensors.

BACKGROUND INFORMATION

Robotic cleaners (e.g., robotic vacuum cleaners) are configured to autonomously clean a surface. For example, a user of a robotic vacuum cleaner may locate the robotic vacuum cleaner in an environment and instruct the robotic vacuum cleaner to commence a cleaning operation. While cleaning, the robotic vacuum cleaner collects debris and deposits it in a dust cup for later disposal by a user. The robotic vacuum cleaner may be configured to automatically dock with a docking station to recharge one or more batteries powering the robotic vacuum cleaner and/or to empty the dust cup.

BRIEF DESCRIPTION OF THE DRAWINGS

These and other features and advantages will be better understood by reading the following detailed description, taken together with the drawings, wherein.

DETAILED DESCRIPTION

The present disclosure is generally related to a robotic cleaner (e.g., a robotic vacuum cleaner) configured to use one or more distance sensors (e.g., time of flight sensors using optical emissions, acoustical emissions, and/or any other time of flight sensor) for purposes of estimating an average velocity of the robotic cleaner (which may be generally referred to herein as the velocity of the robotic cleaner). The robotic cleaner can include a body, one or more driven wheels to urge the body across a surface to be cleaned (e.g., a floor), and at least one distance sensor facing the surface to be cleaned (e.g., such that a detection axis of the distance sensor extends substantially perpendicular to the surface to be cleaned) and configured to output a measure of a detection distance extending from the at least one distance sensor in a direction of the surface to be cleaned. The robotic cleaner can be configured (e.g., using a processor) to detect an abnormality (e.g., an object extending from the surface to be cleaned and/or a recess extending within the surface to be cleaned) based, at least in part, on the measure of the detection distance output by the at least one distance sensor. In response to detecting the abnormality using one or more distance sensors, the robotic cleaner can be configured to track the abnormality over a predetermined distance using the one or more distance sensors (e.g., the one or more sensors can maintain detection of the abnormality over a detection region having a known size and/or a plurality of distance sensors can be spaced a known distance apart and can be used to separately detect the abnormality). The robotic cleaner can also be configured to measure the time it takes to track the abnormality over the known distance such that the velocity of the robotic cleaner, relative to the surface to be cleaned, can be estimated.

In some instances, the use of one or more distance sensors to estimate a velocity of the robotic cleaner may improve the ability of the robotic cleaner to localize itself within a map of an area. For example, the velocity estimate obtained using the one or more distance sensors may be compared to additional velocity estimates (e.g., as estimated using wheel odometers), which may result in a more accurate estimation of a velocity of the robotic cleaner. The distance sensors may also be used to detect non-traversable recesses (e.g., stairs) within the surface to be cleaned. Such a configuration may allow the distance sensors to perform multiple navigation functions (e.g., be used for both localization purposes as well as non-traversable recess avoidance).

Figure 1:
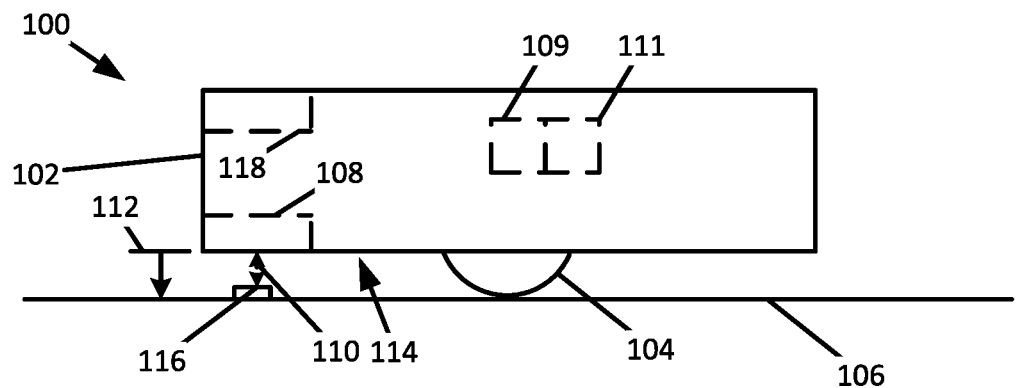
FIG. 1 is a schematic example of a robotic cleaner having a distance sensor, consistent with embodiments of the present disclosure.

FIG. 1 shows a schematic example of a robotic cleaner 100. As shown, the robotic cleaner 100 includes a body 102, at least one driven wheel 104 configured to urge the body 102 across a surface to be cleaned 106 (e.g., a floor), at least one distance sensor 108 (shown in hidden lines) disposed at least partially within the body 102 such that the at least one distance sensor 108 faces the surface to be cleaned and is configured to emit a signal along an axis extending in a direction of (e.g., substantially perpendicular to) the surface to be cleaned 106, and a processor 109 (shown in hidden lines) communicatively coupled to a memory 111 (shown in hidden lines) such that the processor 109 can cause the robotic cleaner 100 to carry out one or more actions pursuant to instructions stored in the memory 111. The distance sensor 108 is configured to output a measure of a detection distance 110 extending from the distance sensor 108 in a direction of the surface to be cleaned 106. For example, the detection distance 110 may be a measure of a vertical distance between the distance sensor 108 and the surface to be cleaned 106 or an object 116 (which may be one example of an abnormality) that extends from the surface to be cleaned 106. A separation distance 112 between a bottom surface 114 of the body 102 and the surface to be cleaned 106 is known by the robotic cleaner 100 (e.g., the separation distance 112 may be a predetermined value, an average value based, at least in part, on measurements made by the distance sensor 108, and/or the like).

The detection distance 110 can be compared to a threshold to determine whether the object 116 has been detected. The threshold can be based, at least in part, on the separation distance 112. For example, when the detection distance 110 (or an average value of the detection distance 110 as taken over a predetermined period of time) measures less than a threshold (e.g., measures less than the separation distance 112 by a predetermined amount), the robotic cleaner 100 can be configured to identify the presence of the object 116 (e.g., using the processor 109). In some instances, the robotic cleaner 100 can be configured to filter outliers from the measured values of the detection distance 110.

When the object 116 is detected (e.g., the presence of the object 116 is identified), the robotic cleaner 100 can be configured to track the object 116 as the robotic cleaner 100 travels over the object 116 using the at least one distance sensor 108. For example, the robotic cleaner 100 can be configured to track the object 116 for a known distance. While tracking the object 116, the robotic cleaner 100 can also be configured to measure the time it takes for the robotic cleaner 100 to travel the known distance. As such, the robotic cleaner 100 can estimate a velocity of the robotic cleaner 100 while tracking the object 116 (e.g., by dividing the distance traveled by time). In other words, the robotic cleaner 100 is configured to determine a velocity estimate based, at least in part, on the detection of the object 116.

The velocity estimate may be used in localizing the robotic cleaner 100 within a map of an area. For example, the robotic cleaner 100 may be configured to estimate its location in a map based, at least in part, on the estimated velocity and compare its estimated location to its actual location (e.g., by comparing features actually observed in an environment to features expected to be observed). Based, at least in part, on the comparison the robotic cleaner 100 may update the map, improving its localization. As such, the robotic cleaner 100 may be able to update its travel path based, at least in part, on the updates to the map. In some instances, the map may be updated in real-time allowing for the travel path to be revised in real-time.

In some instances, the estimate of velocity may be used in conjunction with other localization data (e.g., as obtained from a camera) to better localize the robotic cleaner 100 within a map. Additionally, or alternatively, the velocity estimate obtained by tracking the object 116 can be compared to velocity estimates generated by other sensors (e.g., wheel encoders). Based, at least in part, on the comparison, the robotic cleaner 100 may be configured to generate a composite velocity estimate based, at least in part, on the fusion of data from multiple sensors. As such, the accuracy of the estimated velocity may be improved by utilizing two or more sensors capable of generating data for the estimation of the velocity of the robotic cleaner 100.

For example, in some instances, the robotic cleaner 100 may include a range finder 118 (shown in hidden lines). The range finder 118 may measure a separation distance between the robotic cleaner 100 and an obstacle that the robotic cleaner 100 is moving towards. In other words, the range finder 118 can be configured to measure a distance to obstacles in a movement direction of the robotic cleaner 100. The robotic cleaner 100 can be configured to estimate a velocity of the robotic cleaner 100 based, at least in part, on a rate of change in the measure of the separation distance between the robotic cleaner 100 and the obstacle. The velocity estimate generated using the range finder 118 may be compared to the velocity estimate generated by tracking the object 116. Based, at least in part, on the comparison, the robotic cleaner 100 may generate a composite velocity estimate based, at least in part, on the velocity estimate generated using the range finder 118 and the velocity estimate generated by tracking the object 116.

Figure 2:
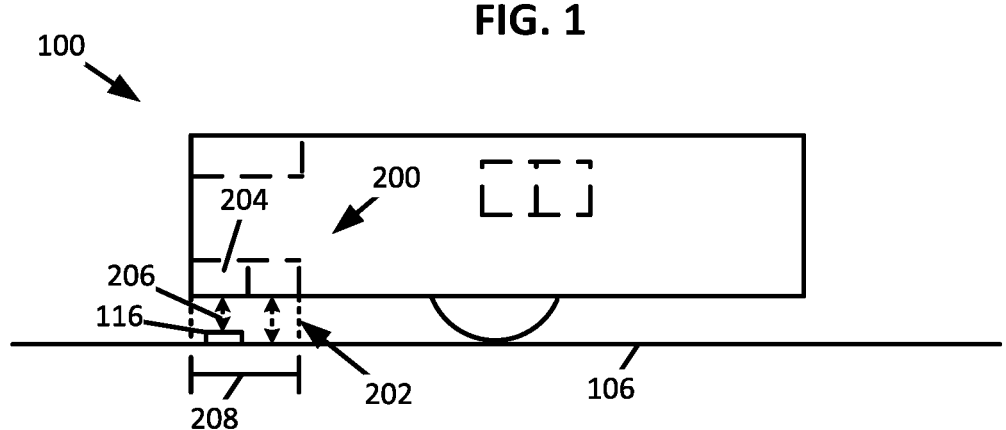
FIG. 2 is a schematic view of an example of the robotic cleaner of FIG. 1, consistent with embodiments of the present disclosure.

FIG. 2 shows a schematic example of the robotic cleaner 100 having a distance sensor 200 (shown in hidden lines), which may be an example of the distance sensor 108 of FIG. 1. The distance sensor 200 includes a plurality of distance sensing pixels 204 that collectively define a detection region 202. Each of the distance sensing pixels 204 provides a respective measurement of a detection distance 206 extending between a respective distance sensing pixel 204 and the surface to be cleaned 106 or the object 116. As such, the object 116 can be tracked using the distance sensor 200 by monitoring which distance sensing pixel 204 detects the object 116. In other words, the object 116 can be tracked based, at least in part, on the distance sensing pixels 204 sequentially detecting the object 116.

In some instances, a contour map can be generated using data from the plurality of distance sensing pixels 204. The contour map can correspond to the detection region 202 and can be used to determine a location of one or more objects 116 within the detection region 202. The robotic cleaner 100 can be configured such that the object 116 and/or the surface to be cleaned 106 can be identified based, at least in part, on the shape of the contour map. For example, the robotic cleaner 100 can be configured to analyze the contour map for changes in the detection distance 206 that indicate the presence of the object 116. Once the object 116 has been identified in the contour map, the robotic cleaner 100 can be configured to track the location of the object 116 within the contour map as the robotic cleaner 100 travels over the object 116.

By tracking the object 116 as it moves through the detection region 202, the robotic cleaner 100 can generate a velocity estimate of the robotic cleaner 100. The velocity estimate may be based, at least in part, on one or more dimensions of the detection region 202 and a measure of the time during which the object 116 was detected within the detection region 202. For example, a measure of a length 208 of the detection region 202 (e.g., as measured along a direction of travel) is known and the time required for the object 116 to travel along the length 208 can be measured. Therefore, an average velocity can be generated by dividing the measure of the length 208 of the detection region 202 by the time in which the object 116 is within the detection region 202.

Detection of the object 116 can be based, at least in part, on the detection distance 206, as measured by a respective distance sensing pixel 204, falling below a threshold. The threshold may be based, at least in part, on a measure of the separation distance 112 between the bottom surface 114 and the surface to be cleaned 106. For example, the threshold may be equal to or less than 99%, 95%, 90%, 85%, 80%, 75%, 70%, 60%, 50%, 40%, 30%, 20%, or 10% of a measure of the separation distance 112. The separation distance 112 may be a predetermined fixed value known by the robotic cleaner 100 or may be based, at least in part, on an average value of a measure of the detection distance 206 over a predetermined time period. In some instances, when the separation distance 112 is determined based, at least in part, on an average value of a measure of the detection distance 206, the calculation of the average may be configured to remove outliers and/or measurements corresponding to detected objects 116.

Figure 3:
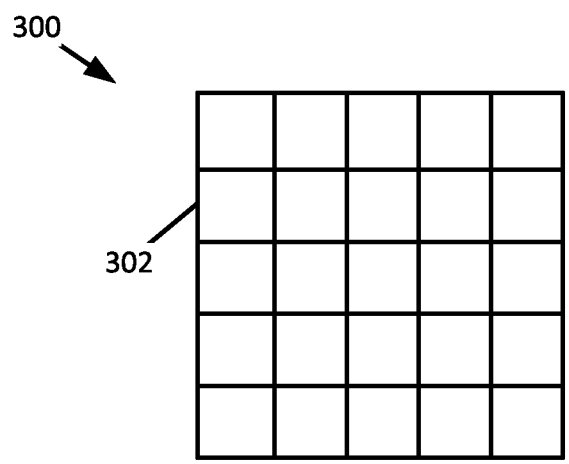
FIG. 3 is a schematic view of an example of a distance sensor, consistent with embodiments of the present disclosure.

FIG. 3 shows a schematic example of a distance sensor 300, which may be an example of the distance sensor 200 of FIG. 2. As shown, the distance sensor 300 includes an array of distance sensing pixels 302. Each distance sensing pixel 302 is configured to generate a measure of a distance corresponding to a distance between the respective distance sensing pixel 302 and the surface to be cleaned 106 or the object 116. The distance sensing pixels 302 may be configured to measure distance based on a time of flight of an optical signal (e.g., an infrared signal), an acoustic signal (e.g., an ultrasonic signal), and/or any other signal.

Figure 4:
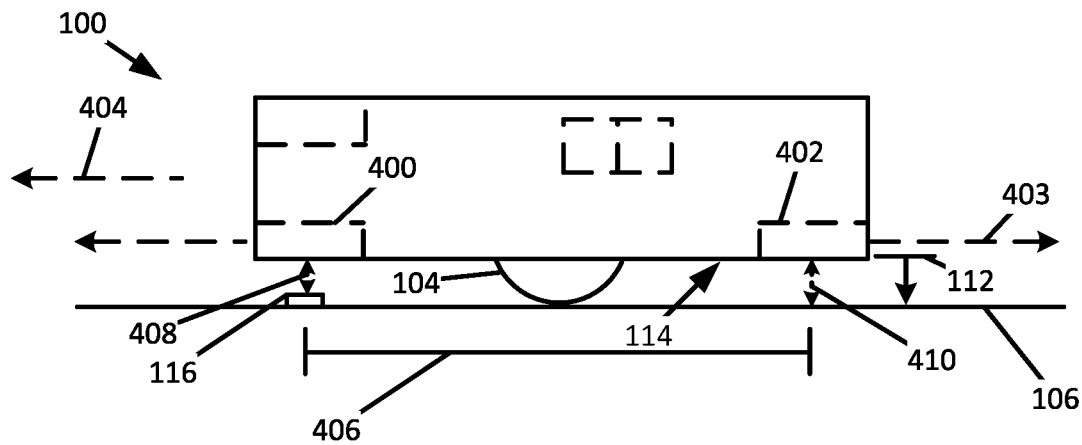
FIG. 4 is a schematic view of an example of the robotic cleaner of FIG. 1, consistent with embodiments of the present disclosure.

FIG. 4 shows a schematic example of the robotic cleaner 100 having at least a first and second distance sensor 400 and 402, which may be examples of the distance sensor 108 of FIG. 1. The distance sensors 400 and 402 may be spaced apart from one another relative to a direction of travel 404 of the robotic cleaner 100. As such, when the robotic cleaner 100 is traveling in a forward direction, one of the first and second distance sensors 400 and 402 detects the presence of the object 116 before the other of the first and second distance sensors 400 and 402. Therefore, an estimate of the velocity of the robotic cleaner 100 may be generated based, at least in part, on a measure of a sensor separation distance 406 extending between the first and second distance sensors 400 and 402 and a measure of time elapsed between detection of the object 116 by one of the first and second distance sensors 400 and 402 and detection of the object 116 by the other of the first and second distance sensors 400 and 402. For example, and as shown, the first and second distance sensors 400 and 402 can be disposed on opposing ends of the robotic cleaner 100 along an axis 403 that extends substantially parallel to the direction of travel 404 (e.g., the axis 403 extends substantially perpendicular to a rotation axis of the at least one driven wheel 104) of the robotic cleaner 100. As such, when the robotic cleaner 100 is traveling in a forward direction, the first distance sensor 400 detects the presence of the object 116 before the second distance sensor 402 detects the presence of the object 116. The velocity estimate can be generated based, at least in part, on the differential detection of the object 116 by the distance sensors 400 and 402 (e.g., the detection of the object 116 by one of the distance sensors 400 and 402 before the other of the distance sensors 400 and 402).

When one of the first or second distance sensors 400 and 402 detects the object 116, the robotic cleaner 100 may store a measure of a detection distance 408 or 410 corresponding to the distance sensor 400 or 402 which first detected the object 116. When the other of the first or second distance sensors 400 and 402 detects the object 116, the robotic cleaner 100 may compare a measure of the other detection distance 408 and 410 to the stored measure of the detection distance. Based, at least in part, on the comparison, the robotic cleaner 100 can determine whether the same object 116 has been detected by both the first and second distance sensors 400 and 402. For example, if the comparison indicates that the measured distance is within 1%, 2%, 5%, 10%, 12%, 15%, 20%, 25%, or 30% of the stored value, the robotic cleaner 100 may determine that the same object 116 was detected by both the first and second distance sensors 400 and 402. If both the first and second distance sensors 400 and 402 are determined to have detected the same object 116, the robotic cleaner 100 may generate an estimated velocity. If a plurality of objects 116 are detected by one of the first and second distance sensors 400 and 402 before one of the objects 116 is detected by the other of the first and second distance sensors 400 and 402 each measured distance may be stored and the robotic cleaner 100 may compare the distance measured by the other of the first and second distance sensors 400 and 402 to each stored value to determine if the measured value corresponds to one of the stored values.

The robotic cleaner 100 can be configured to identify when one or more of the first and second distance sensors 400 and 402 detect the presence of the object 116 based, at least in part, on a respective measure of the detection distance 408 and 410 falling below a threshold. The threshold may be based, at least in part, on a measure of the separation distance 112 between the bottom surface 114 and the surface to be cleaned 106. For example, the threshold may be equal to or less than 99%, 95%, 90%, 85%, 80%, 75%, 70%, 60%, 50%, 40%, 30%, 20%, or 10% of a measure of the separation distance 112. The separation distance 112 may be a predetermined fixed value known by the robotic cleaner 100 or may be based, at least in part, on an average value of a measure of one or more of the detection distances 408 and 410 over a predetermined time period. In some instances, when the separation distance 112 is determined based, at least in part, on an average value of a measure of one or more of the detection distances 408 and 410, the calculation of the average may be configured to remove outliers and/or measurements corresponding to detected objects 116.

In some instances, one or more of the first and second distance sensors 400 and 402 may be an array, similar to the array discussed in relation to FIG. 3. In these instances, velocity may be estimated by tracking the object 116 across one or more the distance sensors 400 and 402 (as discussed in relation to FIG. 2) and based, at least in part, on the independent detection of the object 116 by both the first and second distance sensors 400 and 402. As such, the robotic cleaner 100 may be configured to generate a composite velocity estimate based, at least in part, on the multiple velocity estimates.

Figure 5:
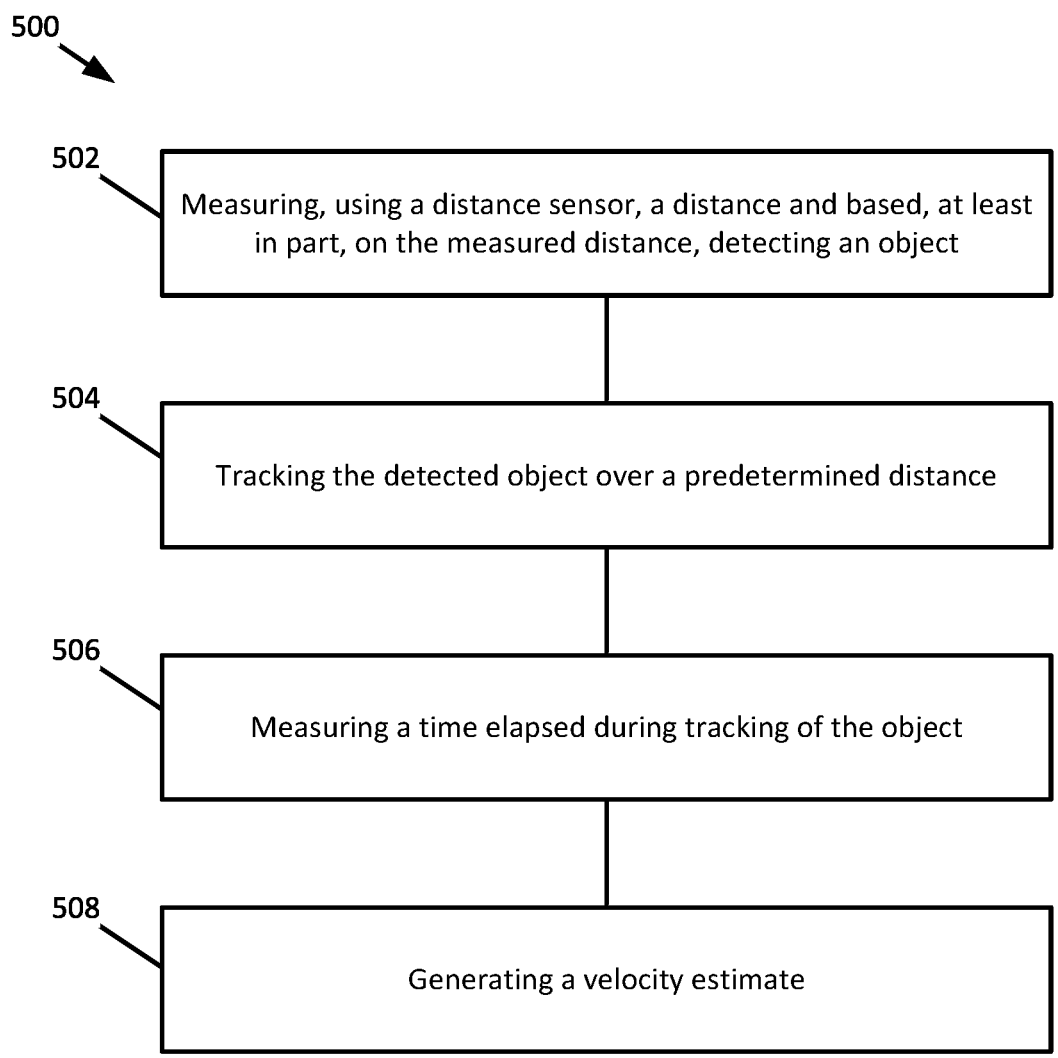
FIG. 5 is a flow chart of an example method of estimating a velocity of the robotic cleaner of FIG. 1, consistent with embodiments of the present disclosure.

FIG. 5 shows a flow diagram of an example method 500 of estimating a velocity of a robotic cleaner, such as the robotic cleaner 100 of FIG. 1. As shown, the method 500 may include a step 502. The step 502 includes measuring, using a distance sensor facing a surface to be cleaned, a distance and detecting based, at least in part, on the measured distance an object disposed between a bottom surface of a body of the robotic cleaner and the surface to be cleaned. The object being detected based, at least in part, on the measured distance falling below a threshold. The threshold being based, at least in part, on a separation distance between a bottom surface of a body of the robotic cleaner and the surface to be cleaned.

The method 500 may also include a step 504. The step 504 may include tracking the detected object over a predetermined distance. The object may be tracked as the robotic cleaner passes over the object. In some instances, the object is tracked using a distance sensor having a plurality of distance sensing pixels, wherein the predetermined distance corresponds to a length of the distance sensor. Additionally, or alternatively, the object may be tracked using a plurality of distance sensors spaced apart from each other by the predetermined distance.

The method 500 may also include a step 506. The step 506 may include measuring a time elapsed during which the object is tracked by the distance sensor. In other words, the step 506 may include measuring a time elapsed while tracking the object over the predetermined distance.

The method 500 may also include a step 508. The step 508 may include generating an estimated velocity of the robotic cleaner based, at least in part, on the predetermined distance and the elapsed time.

The method 500 can be embodied as instructions in at least one non-transitory computer readable medium such that, when the instructions are executed by one or more processors, the method 500 can be caused to be carried out. In some instances, one or more steps of the method 500 can be embodied in circuitry (e.g., an application specific integrated circuit). As such, the method 500 can be carried out using any combination of software, firmware, and/or hardware.

While the discussion accompanying FIGS. 1-5 generally describes tracking an object that extends from a surface to be cleaned in order to estimate a velocity of a robotic cleaner, other abnormalities may be tracked. For example, the robotic cleaner can be configured to track a recess within a surface to be cleaned (e.g., a joint extending between two adjacent tiles) in order to estimate a velocity of the robotic cleaner. In these instances, recesses that are determined to be traversable by the robotic cleaner may be tracked in a similar manner as to that discussed herein in relation to an object extending from the surface to be cleaned.

Figure 6:
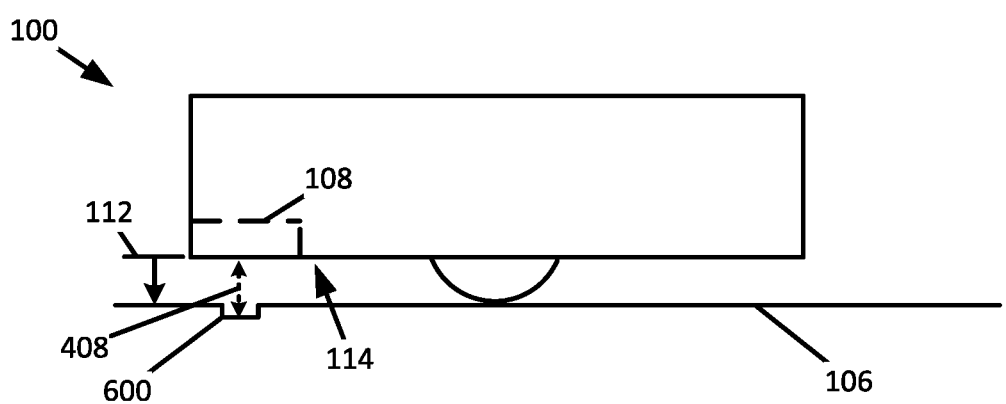
FIG. 6 is a schematic view of an example of the robotic cleaner of FIG. 1, consistent with embodiments of the present disclosure.

FIG. 6 shows an example of the robotic cleaner 100, wherein the robotic cleaner 100 is traveling along the surface to be cleaned 106 in a direction that will result in the robotic cleaner 100 traversing a recess 600 (which may be another example of an abnormality) defined within the surface to be cleaned 106. The presence of the recess 600 may be detected by the robotic cleaner 100 when a measure of the detection distance 110 output by the at least one distance sensor 108 exceeds a predetermined threshold. The threshold may be based, at least in part, on a measure of the separation distance 112 between the bottom surface 114 and the surface to be cleaned 106. For example, the threshold may measure at least 5%, 10%, 15%, 20%, 25%, 30%, 40%, 50%, 60%, 70%, 80%, 90%, or 100% greater than a measure of the separation distance 112.

An example of a robotic cleaner, consistent with the present disclosure, may include a body, one or more driven wheels configured to urge the body across a surface to be cleaned, one or more distance sensors disposed at least partially within the body such that the one or more distance sensors face the surface to be cleaned and a processor. The one or more distance sensors may be configured to output a measure of a detection distance that extends in a direction of the surface to be cleaned. The processor may be configured to determine whether an abnormality has been detected based, at least in part, on the measure of the detection distance and may be configured to determine a first velocity estimate based, at least in part, on the detection of the abnormality.

In some instances, the processor may be further configured to compare the detection distance to a threshold to determine whether the abnormality has been detected. In some instances, the one or more distance sensors may include a plurality of distance sensing pixels. In some instances, the abnormality may be sequentially detected by at least two of the distance sensing pixels such that the abnormality can be tracked as the robotic cleaner passes over the abnormality. In some instances, the one or more distance sensors may include a first distance sensor spaced apart from a second distance sensor. In some instances, the first and second distance sensors may be spaced apart along an axis that extends substantially parallel to a direction of movement of the robotic cleaner. In some instances, the first velocity estimate of the robotic cleaner may be based, at least in part, on a differential detection of the abnormality by each of the first and second distance sensors. In some instances, the robotic cleaner may further include a range finder, the range finder being configured to measure a distance to one or more obstacles in a movement direction of the robotic cleaner. In some instances, a second velocity estimate may be generated based, at least in part, on a rate of change of the measured distance to one or more obstacles in the movement direction of the robotic cleaner. In some instances, the second velocity estimate may be compared to the first velocity estimate to generate a composite velocity estimate.

Another example of a robotic cleaner, consistent with the present disclosure, may include a body, one or more driven wheels configured to urge the body across a surface to be cleaned, one or more distance sensors disposed at least partially within the body and configured to output a measure of a detection distance that extends in a direction of the surface to be cleaned, and at least one processor configured execute one or more instructions stored in at least one memory, upon executing the one or more instructions the processor is configured to cause the robotic cleaner to carry out one or more operations. The operations may include detecting an abnormality disposed between the body and the surface to be cleaned using the one or more distance sensors, tracking the abnormality over a predetermined distance using the one or more distance sensors, measuring a time elapsed while tracking the abnormality over the predetermined distance, and generating a first velocity estimate for the robotic cleaner based, at least in part, on the predetermined distance and the time elapsed.

In some instances, detecting the abnormality may include comparing the measure of the detection distance to a threshold. In some instances, the one or more distance sensors may include a plurality of distance sensing pixels. In some instances, the abnormality may be tracked by sequentially detecting the abnormality using at least two of the distance sensing pixels. In some instances, the one or more distance sensors may include a first distance sensor spaced apart from a second distance sensor. In some instances, the first and second distance sensors may be spaced apart from each other by the predetermined distance along an axis that extends substantially parallel to a direction of movement of the robotic cleaner. In some instances, the first velocity estimate of the robotic cleaner may be based, at least in part, on a differential detection of the abnormality by each of the first and second distance sensors. In some instances, the robotic cleaner may further include a range finder, the range finder being configured to measure a distance to one or more obstacles in a movement direction of the robotic cleaner. In some instances, the operations may further include generating a second velocity estimate based, at least in part, on a rate of change of the measured distance to one or more obstacles in the movement direction of the robotic cleaner. In some instances, the operations may further include generating a composite velocity estimate based, at least in part, on the first and second velocity estimates.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaner comprising:
    a body;
    one or more driven wheels configured to urge the body across a surface to be cleaned;
    a range finder, the range finder being configured to measure a distance to one or more obstacles in a movement direction of the robotic cleaner;

one or more distance sensors disposed at least partially within the body such that the one or more distance sensors face the surface to be cleaned and being configured to output a measure of a detection distance that extends in a direction of the surface to be cleaned; and a processor configured to:
- determine whether an abnormality has been detected based, at least in part, on the measure of the detection distance;
- determine a first velocity estimate based, at least in part, on the detection of the abnormality; and
- determine a second velocity estimate based, at least in part, on a rate of change of the measured distance to one or more obstacles in the movement direction of the robotic cleaner.

2. The robotic cleaner of claim 1, wherein the processor is further configured to compare the detection distance to a threshold to determine whether the abnormality has been detected.

3. The robotic cleaner of claim 1, wherein the one or more distance sensors include a plurality of distance sensing pixels.

4. The robotic cleaner of claim 3, wherein the abnormality is sequentially detected by at least two of the distance sensing pixels such that the abnormality can be tracked as the robotic cleaner passes over the abnormality.

5. The robotic cleaner of claim 1, wherein the one or more distance sensors include a first distance sensor spaced apart from a second distance sensor.

6. The robotic cleaner of claim 5, wherein the first and second distance sensors are spaced apart along an axis that extends substantially parallel to a direction of movement of the robotic cleaner.

7. The robotic cleaner of claim 6, wherein, the first velocity estimate of the robotic cleaner is based, at least in part, on a differential detection of the abnormality by each of the first and second distance sensors.

8. The robotic cleaner of claim 1, wherein the second velocity estimate is compared to the first velocity estimate to generate a composite velocity estimate.

9. A robotic cleaner comprising:
a body;
one or more driven wheels configured to urge the body across a surface to be cleaned;
one or more distance sensors disposed at least partially within the body and configured to output a measure of a detection distance that extends in a direction of the surface to be cleaned, the one or more distance sensors including a plurality of distance sensing pixels; and
at least one processor configured execute one or more instructions stored in at least one memory, upon executing the one or more instructions the processor is configured to cause the robotic cleaner to carry out operations comprising:
- detecting an abnormality disposed between the body and the surface to be cleaned using the one or more distance sensors;
- tracking the abnormality over a predetermined distance by sequentially detecting the abnormality using at least two of the distance sensing pixels;
- measuring a time elapsed while tracking the abnormality over the predetermined distance; and
- generating a first velocity estimate for the robotic cleaner based, at least in part, on the predetermined distance and the time elapsed.

10. The robotic cleaner of claim 9, wherein detecting the abnormality includes comparing the measure of the detection distance to a threshold.

11. The robotic cleaner of claim 9 further comprising a range finder, the range finder being configured to measure a distance to one or more obstacles in a movement direction of the robotic cleaner.

12. The robotic cleaner of claim 11, wherein the operations further comprise generating a second velocity estimate based, at least in part, on a rate of change of the measured distance to one or more obstacles in the movement direction of the robotic cleaner.

13. The robotic cleaner of claim 12, wherein the operations further comprise generating a composite velocity estimate based, at least in part, on the first and second velocity estimates.

* * * * *